March 13, 1928. 1,662,702
J. C. HEBDEN
DECANTER
Filed Dec. 24, 1923 2 Sheets-Sheet 1

Inventor
John C. Hebden
By
Attorney

March 13, 1928.
J. C. HEBDEN
DECANTER
Filed Dec. 24, 1923
1,662,702
2 Sheets-Sheet 2
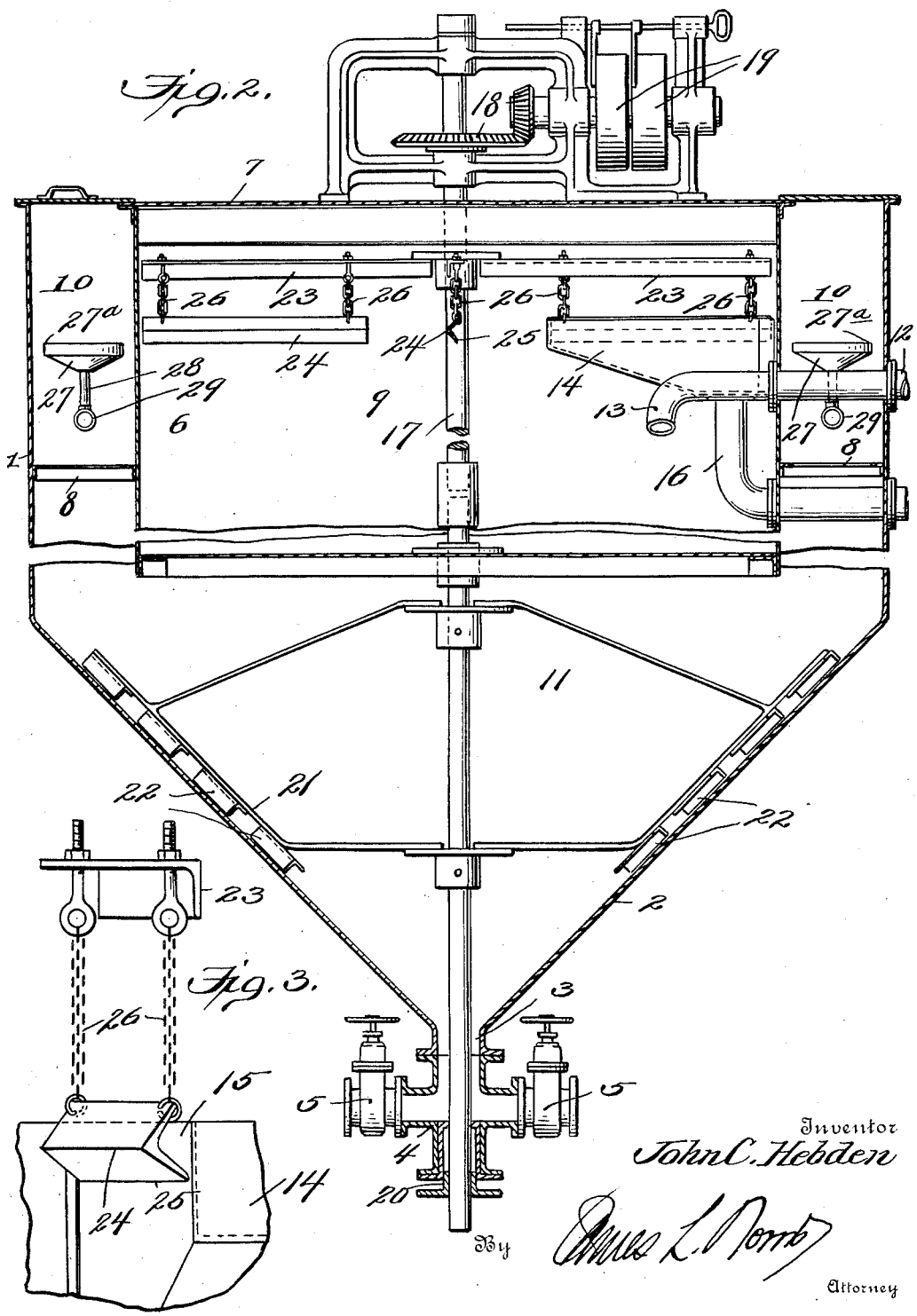

Patented Mar. 13, 1928.

1,662,702

UNITED STATES PATENT OFFICE.

JOHN C. HEBDEN, OF NEW YORK, N. Y., ASSIGNOR TO HEBDEN SUGAR PROCESS CORPORATION, OF NEW YORK, N. Y., A CORPORATION OF NEW YORK.

DECANTER.

Application filed December 24, 1923. Serial No. 682,488.

The present invention relates to improvements in decanters and more especially to those of the class adapted for use in separating liquids from scum or sediment forming impurities. The primary object of the invention is to provide a novel and improved decanter of this class which is capable of operating continuously and efficiently to separate a liquid from scum or sediment forming impurities, or both, whereby such separation may be effected rapidly and thoroughly, the invention thus enabling the decanter to treat a much larger quantity of liquid than has been possible with decanters of the kinds heretofore used. More particular objects of the invention are to provide a decanter having means for preliminarily separating the bulk of the impurities from the liquid, in the form of a scum or a sediment, or both, while the liquid under treatment is flowing, after which the liquid is decanted, and to provide means for removing the impurities so separated continuously while the clarified or purified liquid is being continuously decanted or drawn off.

To these and other ends, the invention consists in certain improvements and combinations and arrangements of parts, all as will be hereinafter more fully described, the features of novelty being pointed out particularly in the claims at the end of the specification.

In the accompanying drawings:

Figure 2 represents a vertical section through the decanter shown in Figure 1, the section being taken on the line 2—2 of Figure 1, and Figure 3 is a detailed view, on an enlarged scale, of the preferred form of skimmer and scum removing trough.

Similar parts are designated by the same reference characters in the several views.

Figure 1:
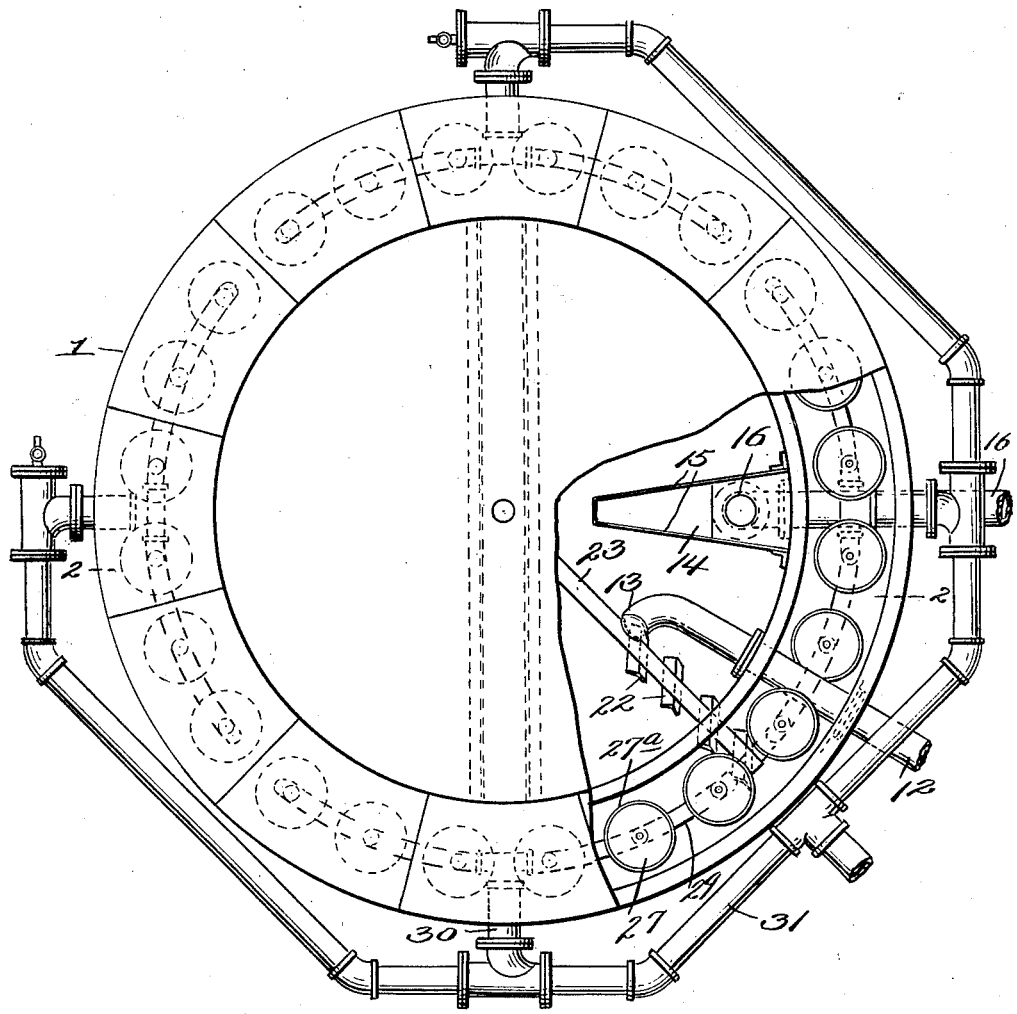
Figure 1 is a top plan view, partly in section, of a decanter constructed in accordance with the preferred embodiment of the invention.

Decanters constructed in accordance with the present invention are applicable to various uses where it is desirable or necessary to separate impurities, especially those of the scum or sediment forming kinds, or both, from a liquid. For example, it may be used very advantageously in the manufacture of sugar, for the purpose of removing impurities from sugar juices or sugar solutions, such as those occurring in the course of manufacture of sugar, the invention enabling large quantities of sugar juice or sugar solution to be treated rapidly and efficiently, the impurities or substances to be removed which have a lower specific gravity than that of the liquid, such as bagasse or other refuse, being removed as a scum, and the impurities or substances having a higher specific gravity than that of the liquid, such as dirt, or precipitates or the like formed or occuring incident to the treatment of the juices or solutions, being removed as a sediment or mud.

The preferred embodiment of the invention is shown in the accompanying drawings and will be hereinafter described in detail, the decanter shown being adapted for the removal of both scum and sediment. It is to be understood, however, that the invention is applicable to the treatment of liquids of various kinds containing either scum or sediment forming impurities, or both, and it is further to be understood that the invention is not restricted to the particular constructions shown, as equivalent constructions may be used in adapting the invention to different uses, and such constructions are comprehended within the scope of the claims.

In the present instance, the decanter comprises generally a tank or other suitable receptacle 1, the upper portion of which may be cylindrical or substantially so, as shown, and the lower portion of which may be of substantially conical or tapered form to provide a bottom 2, the walls of which are inclined at a suitable angle to facilitate the flow of sediment or mud toward a sediment or mud outlet 3, which latter is provided in the lower end or apex of the conical bottom. A suitable fitting 4 may be attached to this outlet 3 and provided with one or more suitable valves 5 to regulate or control the discharge of sediment or mud. An annular partition 6 is mounted within the upper portion of the tank, this partition forming a wall which is continuous circumferentially and its upper edge may be attached to the top wall 7 of the tank, while the partition may be supported or braced within the tank by braces 8 which may be of any suitable kind. The annular partition 6 thus forms an inner liquid-receiving and impurity-separating chamber 9 within it and an outer or surrounding annular decanting or discharge chamber 10, the bottoms of both of these chambers, however, being open to the lower portion 11 of the tank.

Suitable means is provided for introducing the liquid to be treated into the decanter. In the present instance, an inlet pipe 12 is provided for this purpose, this pipe extending through the wall of the tank 1 and the partition 6 and discharging within the inner chamber 9. Preferably the liquid to be treated is so introduced into the chamber 9 that it will maintain a revolving motion of the liquid under treatment in this chamber, thus affording ample opportunity for the impurities or substances of relatively lower specific gravity to rise to the surface of the liquid in this chamber and thus form a scum, and the impurities or substances of relatively higher specific gravity to settle out through the open bottom of this chamber and to collect in the bottom of the tank. This revolving motion of the liquid in the chamber 9 may be obtained, for example, by providing a laterally or tangentially extending portion 13 on the inner end of the liquid inlet or supply pipe 12.

The sediment or mud may be discharged continuously, or otherwise, from the bottom of the tank through the sediment outlet 3, and means is provided for discharging scum which accumulates on the surface of the liquid within the chamber 9. A scum discharge trough 14 is shown for this purpose in the present instance, it being suitably fixed within the chamber 9 so that it projects a suitable distance above the level of the liquid in this chamber. Preferably the trough embodies walls 15 which are radial or substantially so with respect to the center of the partition 6, the latter being preferably circular, and a discharge pipe 16 extends from the bottom of the trough 14 outwardly to the exterior of the decanter.

Means is preferably provided for skimming the scum from the top of the liqiud contained in the chamber 9 and the discharge of such scum into the trough 14, and also for the advancement of the sediment or mud collecting on the bottom 2 toward the sediment discharge outlet 3. Preferably and as shown in the present instance, a shaft 17 is mounted preferably centrally of the vertical axis of the tank and partition 6, the upper end of this shaft extending, in the present instance, upwardly through the top or cover 7 and having suitable means, such, for example, as the bevel gearing 18 and pulleys 19 for revolving it continuously but slowly. The lower end of this shaft may extend downwardly through the sediment outlet 3 and through a packing gland 20. The shaft has a suitable frame 21 fixed thereto, this frame carrying means, such as plows or scrapers 22 arranged to travel over the inclined surface of the bottom 2 of the tank, the plows having a suitable pitch, as shown in Figure 1, whereby they will act to remove any sediment or mud deposited on the bottom 2 and to move such sediment or mud inwardly so that it may enter and discharge through the outlet 3. The upper portion of the shaft 17 has fixed thereto a suitable number of arms 23 which carry skimmers 24. The skimmers may be of any suitable form, they being of angle form in cross section in the present instance, so as to provide a lower lip 25, and the skimmers are preferably suspended from the respective arms 23, as, for example, by chains 26. The lower edges or lips 25 of the skimmers are preferably radial to the axis of the shaft 17, and during the rotation of the shaft the skimmers which operate in a plane at or slightly below the level of the liquid in the chamber 9, will skim the scum from the top of the liquid and will convey it to the trough 14. When the lip 25 of the skimmer reaches the trough, the advance of the skimmer will be momentarily arrested, but the continued rotation of the skimmer-carrying arm 23 will cause the lip 25 of the skimmer to ride up on the adjacent wall 15 of the trough, incident to which the scum held between the skimmer and said wall of the trough will be lifted, and as the continued rotation of the skimmer-supporting arm 23 causes the lip 25 of the skimmer to ride over the upper edge of the wall 15, the sediment collected by the skimmer will be deposited into the trough. As the skimmer strikes the opposite wall 15 of the trough, incident to the passage of the skimmer over the trough, any scum that may adhere to the skimmer will be removed therefrom. It will be understood that during the operation of the decanter, the skimmers function to skim the scum from the liquid and to advance the scum to and discharge it into the trough 14.

The purified or clarified liquid is discharged from the outer annular chamber 10, it being understood that the liquid enters the upper portion of the liquid-receiving and impurity-separating chamber 9, then flows downwardly through the open bottom of the chamber 9, then flows outwardly around the lower edge of the partition 6 and then flows upwardly in the surrounding or annular decanting or discharge chamber 10. Different means may be provided for removing the clarified or purified liquid. It is preferable, however, to employ a weir construction which presents a relatively long aggregate length of weir edge so that the depth of the liquid discharging over the weir structure will be relatively shallow, thereby restraining any particles of matter which may be carried in the liquid from discharging into the liquid outlet. Preferably and as shown in the present instance, a number of decanting or discharge cups 27 are provided, these cups being preferably arranged in an annular series within the chamber 10. For example, as shown in the present instance, the cups may be provided with discharge pipes or stems 28 which are connected to an arcuate manifold 29, a group of cups being connected to or carried by each manifold, and each manifold may be connected by a branch pipe 30 to a discharge pipe 31, the latter being conveniently arranged exteriorly of the tank. Each cup 27 has an upstanding edge 27$^a$ over which the liquid to be discharged flows, the edges of the entire series of cups being horizontal and preferably all on the same level. The upstanding edges 27$^a$ of the cups form, in effect, weirs over which the discharging liquid is decanted and as the aggregate length of these edges is relatively large, the depth of the liquid discharging over these edges, which act as weirs, is relatively small or shallow, so that any solid particles which may be carried along with the liquid will be intercepted by these weir edges and thereby prevented from discharging with the liquid. The height of the weir edges 27$^a$ of the cups, it will be understood, determines the height of the liquid in the inner chamber 9, these chambers being in communication with one another through their open bottoms.

Introduction of the liquid to be treated into the chamber 9 causes the liquid in said chamber to descend therein and then flow upwardly in the adjacently-located outer chamber 10 which is on the same level with the chamber 9. Those impurities contained in the liquid which are of relatively lower specific gravity than that of the liquid will rise to the surface of the body of liquid in the chamber 9 and form a scum which will be removed by the skimmers operating in conjunction with the scum discharge trough; and those impurities in the liquid under treatment which are of a relatively higher specific gravity than that of the liquid will settle to the bottom of the tank and discharge through the sediment or mud outlet, preferably assisted by the revolving plows. The down-flow of the liquid under treatment in the chamber 9 tends to direct the relatively heavier particles in the liquid toward the bottom of the tank, and the reversal in the direction of flow of the liquid which takes place around the lower edge of the partition which separates the chambers 9 and 10 assists in separating the heavier particles from the liquid flowing toward the liquid outlet.

The multiple decanting cups or vessels located in the outer chamber 10, which receive the liquid after the scum has been skimmed off and the heavier particles separated therefrom as a sediment or mud, are capable of discharging a relatively large volume of the liquid, although, owing to the great aggregate length of weir afforded by their upper edges, the depth of the liquid flowing thereover is relatively small, so that any particles that may be carried along by the liquid as far as the decanting cups will be intercepted by the latter and thus prevented from discharging with the treated liquid.

By treating the liquid substantially in the manner hereinbefore described, to separate and remove therefrom impurities or other particles contained therein, prior to its decantation, these impurities or other particles may substantially all be removed from the liquid before the latter reaches the decanting cups or vessels, and hence decantation of the liquid may be maintained continuously and without appreciable clogging or other interference by impurities or other particles contained in the liquid.

The decanter is particularly adapted for treatment of the liquid while the same flows continuously, thus affording the maximum capacity for the decanter and also securing the advantage that other treatments to which the liquid may be subjected prior and subsequent to its treatment in the decanter may be performed continuously or without interruption. To secure these results, the decanter embodies means for the continuous inflow and outflow of the liquid, and the removal of the scum or the sediment, or both, without the necessity of interrupting the flow of the liquid through the decanter.

I claim as my invention:—

1. A decanter comprising an impurity-separating chamber adapted to receive the liquid to be treated and a decanting chamber arranged to receive liquid from the separating chamber, and a plurality of decanting cups having upstanding surrounding edges all of which lie in the same horizontal plane and form weirs arranged in the decanting chamber to cause the liquid to flow uniformly upwardly throughout the horizontal area of the decanting chamber and to be decanted over said weirs.

2. A decanter comprising an impurity-separating chamber and a decanting chamber adjacent thereto, the lower portions of said chambers being connected for intercommunication, means for supplying liquid to be treated to the separating chamber and a row of decanting cups occupying substantially the width of the decanting chamber and having upstanding surrounding edges all of which lie in the same horizontal plane and form weirs distributed in the decanting chamber to cause the liquid to flow uniformly upwardly throughout the area thereof and to be decanted over said weirs.

3. A decanter comprising an elongated decanting chamber provided with means for supplying to the bottom thereof the liquid to be treated, and decanting cups having surrounding upstanding edges all of which lie in the same horizontal plane and form weirs which occupy substantially the full horizontal width of said chamber and are distributed therein to cause the liquid to flow uniformly upwardly throughout the area of the decanting chamber and to decant evenly over said weirs.

4. A decanter comprising an elongated decanting chamber provided with means for supplying the liquid to be treated to the lower portion thereof, and a series of decanting cups having surrounding upstanding edges all lying in the same horizontal plane and forming weirs distributed uniformly in the direction of the length of said chamber and occupying substantially the full width thereof to cause the liquid to flow uniformly upwardly throughout the area of said chamber and to decant over said weirs.

5. A decanter comprising receiving and discharge chambers the upper portions of which are separated by a partition and the lower portions of which are connected for inter-communication, means for introducing liquid to be treated into the receiving chamber, and a series of decanting cups having surrounding upstanding edges forming weirs all of which lie in the same horizontal plane and occupy substantially the full horizontal area of the discharge chamber for causing uniform upward flow of the liquid therein and decanting of the liquid evenly over the weir edges.

6. A decanter comprising a liquid-receiving chamber having means for supplying liquid thereto whereby the liquid will flow downwardly therein, a discharge chamber having its lower portion connected to receive liquid from the lower portion of the receiving chamber, and a series of discharge cups in said discharge chamber each cup having a surrounding weir edge for decanting liquid from the upper portion of the discharge chamber.

7. A decanter comprising a tank having in its upper portion a liquid-receiving chamber and a relatively narrow annular liquid discharge chamber, the lower ends of said chamber being open to the bottom of said tank, means for supplying liquid to be treated to the receiving chamber, and a series of discharge cups distributed circumferentially in said annular discharge chamber and occupying substantially the full width thereof, said cups having surrounding weir edges for decanting liquid from the upper portion of the discharge chamber.

8. In apparatus of the class described, a chamber having means for supplying thereto liquid to be treated, liquid-decanting means located on substantially the same level with said chamber and connected to receive liquid therefrom, scum-discharge means located adjacent to the liquid level in said chamber, and a skimmer having a forwardly directed lip operative in said chamber below the liquid level therein to collect scum from the surface of the liquid and to convey the collected scum to the scum-discharge means.

9. In apparatus of the class described, a chamber to contain a liquid to be treated, liquid-decanting means located on substantially the same level with said chamber and connected to receive liquid therefrom, a scum-discharge trough mounted to project above the surface of the liquid in said chamber, and a skimmer having a forwardly and downwardly extending lip operative in a plane below the surface of the liquid in said chamber to collect scum from the surface of the liquid and to lift the collected scum into said trough.

10. In apparatus of the class described, a chamber to contain a liquid to be treated, liquid-decanting means located on substantially the same level with said chamber and connected to receive liquid therefrom, a scum discharge trough having an edge arranged to project above the surface of the liquid in said chamber, a member mounted to travel over the surface of the liquid in said chamber, and a skimmer flexibly suspended from said member and having a forwardly-extending scum-collecting lip operative in a plane below the surface of the liquid in said chamber to skim the surface of the liquid and lift the scum collected by it into said trough.

In testimony whereof I have hereunto set my hand.

JOHN C. HEBDEN.